(12) United States Patent
Liu et al.

(10) Patent No.: US 10,014,941 B2
(45) Date of Patent: Jul. 3, 2018

(54) PHOTON DATA TRANSMISSION METHOD AND TRANSMISSION DEVICE FOR MOBILE TERMINAL, AND PHOTON DATA RECEIVING DEVICE

(71) Applicant: KUANG-CHI INTELLIGENT PHOTONIC TECHNOLOGY LTD., Shenzhen (CN)

(72) Inventors: Ruopeng Liu, Shenzhen (CN); Silu Xu, Shenzhen (CN)

(73) Assignee: KUANG-CHI INTELLIGENT PHOTONIC TECHNOLOGY LTD., Shenzhen (CN)

( * ) Notice: Subject to any disclaimer, the term of this patent is extended or adjusted under 35 U.S.C. 154(b) by 0 days.

(21) Appl. No.: 15/361,402

(22) Filed: Nov. 26, 2016

(65) Prior Publication Data

US 2017/0078020 A1   Mar. 16, 2017

Related U.S. Application Data

(63) Continuation of application No. PCT/CN2015/082843, filed on Jun. 30, 2015.

(30) Foreign Application Priority Data

May 29, 2014  (CN) .......................... 2014 1 0235636

(51) Int. Cl.
*H04B 10/00* (2013.01)
*H04B 10/116* (2013.01)
(Continued)

(52) U.S. Cl.
CPC ......... *H04B 10/116* (2013.01); *H04B 1/3833* (2013.01); *H04B 10/071* (2013.01);
(Continued)

(58) Field of Classification Search
CPC ..... H04W 12/06; H04B 10/116; H04B 10/70; H04B 10/071; H04B 10/40; H04B 1/3833
See application file for complete search history.

(56) References Cited

U.S. PATENT DOCUMENTS 8,620,163 B1 * 12/2013 Sleator ................. H04B 10/116 348/116
9,240,837 B2 * 1/2016 Sleator ............. H04B 10/25752
(Continued)

FOREIGN PATENT DOCUMENTS

CN     102196322 A     9/2011
CN     103051798 A     4/2013
(Continued)

*Primary Examiner* — Agustin Bello
(74) *Attorney, Agent, or Firm* — Perkins Coie LLP (57) ABSTRACT

The present disclosure discloses a photon data transmission method and device for a mobile terminal, where to-be-transmitted data is encoded by tuning a light luminance intensity combination so as to send more information and improve security. Preferably, before encoding, luminance of a flash is controlled and data of a specific information amount is sent, and a photonic receive end recognizes a light signal, and according to a recognition result, determines a maximum quantity of luminance levels of signals supported by the photonic receive end, and then performs encoding according to a recognition capability of the photonic receive end. In this way, it is ensured that the photonic receive end can recognize the signals, and that sent code can make full use of luminance of a flash of a mobile phone.

6 Claims, 2 Drawing Sheets

(51) Int. Cl.
*H04B 1/3827* (2015.01)
*H04B 10/071* (2013.01)
*H04B 10/40* (2013.01)
*H04B 10/70* (2013.01)
*H04W 12/06* (2009.01)

(52) U.S. Cl.
CPC ............ *H04B 10/40* (2013.01); *H04B 10/70* (2013.01); *H04W 12/06* (2013.01)

(56) References Cited

U.S. PATENT DOCUMENTS

| | | | |
|---|---|---|---|
| 9,479,251 B2* | 10/2016 | Muijs | H04B 10/116 |
| 2005/0128166 A1* | 6/2005 | Tanaka | G09G 3/2986 |
| | | | 345/60 |
| 2009/0052902 A1* | 2/2009 | Shinokura | H04B 10/1143 |
| | | | 398/118 |
| 2010/0172651 A1* | 7/2010 | Nien | H04B 10/1141 |
| | | | 398/135 |
| 2010/0260505 A1* | 10/2010 | Dahan | H04B 10/505 |
| | | | 398/183 |
| 2016/0352419 A1* | 12/2016 | Fonseka | H04B 10/0793 |
| 2017/0078017 A1* | 3/2017 | Dahan | H04B 10/07953 |
| 2017/0078020 A1* | 3/2017 | Liu | H04B 10/116 |
| 2017/0180043 A1* | 6/2017 | Liu | H04B 10/0795 |
| 2017/0302485 A1* | 10/2017 | Brandt-Pearce | H04L 25/4902 |

FOREIGN PATENT DOCUMENTS

| | | |
|---|---|---|
| CN | 103490812 A | 1/2014 |
| CN | 103795465 A | 5/2014 |
| GB | 2496379 A | 5/2013 |
| JP | 2007097071 A | 4/2007 |
| WO | 2014015353 A2 | 1/2014 |

\* cited by examiner

PHOTON DATA TRANSMISSION METHOD AND TRANSMISSION DEVICE FOR MOBILE TERMINAL, AND PHOTON DATA RECEIVING DEVICE

CROSS REFERENCE TO RELATED APPLICATIONS

This application is a continuation of PCT Application No. PCT/CN2015/082843 filed on Jun. 30, 2015, which claims priority to Chinese patent application No. 201410235636.4 of May 29, 2014, both of which are incorporated herein by reference.

TECHNICAL FIELD

The present disclosure relates to a photon data transmission method and transmission device for a mobile terminal, and a photon data receiving device, and in particular, to application thereof in an identity authentication system.

BACKGROUND

A light-controlled system that is applied to an access control system is called a photonic access control system. The photonic access control system includes an access management system, a mobile terminal (for example, a mobile phone photonic client, namely, a photonic signal transmitter implemented by a mobile phone, which may also be called a photonic mobile phone, a mobile phone photonic client with a light emitting device, or a mobile phone photonic key or the like), a photonic receive end and the like.

A conventional access management system uses a smart card as a unique personal identifier to get registered on a distribution platform (network) beforehand (related registration data is stored onto a controller by using a device network). When accessing a door, a user slightly swings a held smart card within a valid range of a card reader to perform feature recognition. After being read by the card reader, data of the smart card is transmitted to the controller, and the controller determines the identity according to matching between the stored registration information and acquired data. If the matching succeeds, processing is performed normally, that is, an electronic lock is driven to open the door; otherwise, the door keeps closed, and event information may be transmitted to a system such as an alarm system and a monitoring system so that a third party processes the event information.

Likewise, in a photonic access control system, identity recognition information of a mobile phone photonic client needs to be allocated. For the photonic access control system, an ID may be used to uniquely recognize the mobile phone photonic client, which, however, requires an ID allocation platform (network) for allocating IDs together. After the IDs are allocated, a light emitting device (for example, a flash on the mobile phone photonic client) enables the photonic receive end to obtain a correct light signal.

If the light emitting device is the flash of the mobile phone itself, because a light emitting frequency is currently low when the mobile phone uses a program to control light emission of the flash, a transmitted information quantity is much limited, and it takes a long time to send a relatively long ID. After IDs are allocated together, although ID uniqueness is accomplished without any duplicate ID in different devices, the ID is longer, which exacerbates the problem.

SUMMARY

The present disclosure aims to provide a photon data transmission method and transmission device for a mobile terminal, and a photon data receiving device, which can ensure that data is encoded and sent by making full use of flash intensity of a mobile terminal (such as a mobile phone) and can also ensure that a photonic receive end can correctly receive and decode the data that is encoded by using luminance.

A photon data transmission method for a mobile terminal, including the following steps:

using light signals with different luminance to denote to-be-transmitted data, where the light signal has N luminance levels;

encoding $0-(N-1)$ M-ary numbers when the light signal is a single light signal element: using one light signal element with a corresponding luminance level to represent one M-ary number, so that a series of light signal elements represent a series of M-ary numbers;

performing combination coding on $0-(N^n-1)$ M-ary numbers when the light signal is a combination of n light signal elements: using one light signal element combination with a corresponding luminance level combination to represent one M-ary number, so that a series of light signal element combinations represent a series of M-ary numbers, where M and N are natural numbers and n is an integer greater than 1; and sending the to-be-transmitted data as a light signal.

Further, before the encoding step, the method further includes the following steps:

A. generating test data: generating a set of test data or receiving a set of test data from a server;

B. encoding the test data by using light with luminance tuned at a specific quantity of luminance levels, and sending a test light signal: controlling luminance of a flash, encoding the test data by using the light with luminance tuned at the specific quantity of luminance levels, and then aiming at a photonic receive end and sending the test data as light information; and encoding the $0-(N-1)$ M-ary numbers when the test light signal is a single light signal element: using one light signal element with a corresponding luminance level to represent one M-ary number, so that a series of light signal elements represent a series of M-ary numbers; or performing combination coding on $0-(N^n-1)$ M-ary numbers when the test light signal is a combination of n light signal elements: using one light signal element combination with a corresponding luminance level combination to represent one M-ary number, so that a series of light signal element combinations represent a series of M-ary numbers, where M and N are natural numbers and n is an integer greater than 1; and C. obtaining, according to a result of recognizing the test data by the photonic receive end, a maximum quantity of light intensity levels that can be recognized by the photonic receive end for tuning luminance of a light signal; and encoding the to-be-transmitted data in the encoding step by using the light signal with luminance tuned at the obtained maximum quantity of light intensity levels.

Further, step C includes the following steps:

C1. determining, according to a recognition result of the photonic receive end, whether the photonic receive end can recognize a light signal with luminance tuned at a current specific quantity of luminance levels; and C2. searching for a maximum quantity of light intensity levels that can be recognized by the photonic receive end for tuning luminance of the light signal: after determining that the photonic receive end can recognize the light signal with luminance tuned at the specific quantity of luminance levels, recording a value of the recognizable luminance level, increasing a quantity of the luminance level for tuning luminance, and repeating step B; or, after determining that the photonic receive end cannot recognize the light signal with luminance tuned at the specific quantity of luminance levels, reducing a quantity of the luminance level for tuning luminance, and then repeating step B; and C3. recording a maximum value in all recorded recognizable luminance levels as a maximum quantity of light intensity levels that can be recognized by the photonic receive end for tuning luminance of the light signal.

Further, step C1 includes the following steps:

C1-1. repeating, for a preset quantity of times, the step of encoding the test data by using light with luminance tuned at the specific quantity of luminance levels, and aiming at the photonic receive end and sending the test data as light information, and after the receive end receives and recognizes the test data, comparing and determining whether decoding each time is correct: comparing the test data with a corresponding field of decoded data, where it is indicated that the decoding is correct if the data is equal; and C1-2. calculating a recognition ratio and determining availability: calculating a recognition ratio according to a quantity of times of correct decoding; and if the recognition ratio reaches or exceeds a specified threshold, determining that the photonic receive end can recognize the light signal with luminance tuned at the specific quantity of luminance levels.

Further, the method includes the following steps:

storing the test data: saving the test data into a first storage table of a host or a server over the web; and storing the received and decoded data: saving, by the photonic receive end, the decoded data into a second storage table of the same host or server, where the comparing and determining, in step C1-1, whether decoding each time is correct is implemented in the following way: accessing the first storage table and the second storage table of the host or server, and comparing data of a corresponding field in the first storage table and the second storage table.

The present disclosure further discloses a photon data transmission device for a mobile terminal, including: an encoding module, configured to: use light signals with different luminance to denote to-be-transmitted data, where a quantity of luminance levels of the light signal is N;

encode $0-(N-1)$ M-ary numbers when the light signal is a single light signal element: use one light signal element with a corresponding luminance level to represent one M-ary number, so that a series of light signal elements represent a series of M-ary numbers, where M and N are natural numbers;

perform combination coding on $0-(N^n-1)$ M-ary numbers when the light signal is a combination of n light signal elements: use one light signal element combination with a corresponding luminance level combination to represent one M-ary number, so that a series of light signal element combinations represent a series of M-ary numbers, where M and N are natural numbers and n is an integer greater than 1; and a sending device, configured to send the to-be-transmitted data as a light signal.

Preferably, the photon data transmission device for a mobile terminal further includes: a test data generation module: configured to generate a set of test data or receive a set of test data from a server; a test data encoding module, configured to: control luminance of a flash, encode the test data by using light with luminance tuned at a specific quantity of luminance levels, and then aim at a photonic receive end and send a test light signal as light information;

encode $0-(N-1)$ M-ary numbers when the test light signal is a single light signal element: use one light signal element with a corresponding luminance level to represent one M-ary number, so that a series of light signal elements represent a series of M-ary numbers;

perform combination coding on $0-(N^n-1)$ M-ary numbers when the test light signal is a combination of n light signal elements: use one light signal element combination with a corresponding luminance level combination to represent one M-ary number, so that a series of light signal element combinations represent a series of M-ary numbers, where M and N are natural numbers and n is an integer greater than 1; and a determining module, configured to determine a maximum quantity of luminance levels that can be recognized by the photonic receive end, where the encoding module encodes the to-be-transmitted data according to a light signal with luminance tuned at the maximum quantity of light intensity levels.

The determining module includes a discrimination device that determines, according to a recognition result of the photonic receive end, whether the photonic receive end can recognize a light signal with luminance tuned at a current specific quantity of luminance levels, and the discrimination device includes:

a comparing and determining module, configured to: for the light information sent by aiming at the photonic receive end after repeating, for a preset quantity of times, the step of encoding the test data by using light with luminance tuned at the specific quantity of luminance levels, compare the test data with a corresponding field of data decoded by the photonic receive end, and determine that the decoding is correct if the data is equal; and a recognition module, configured to calculate a recognition ratio according to a quantity of times of correct decoding of the photonic receive end; and if the recognition ratio reaches or exceeds a specified threshold, determine that the photonic receive end can recognize the light signal with luminance tuned at the specific quantity of luminance levels.

A photon data receiving device, including:

a comparing and determining module, configured to: repeat, for a preset quantity of times, the step of receiving the light signal generated by encoding test data by using light with luminance tuned at a specific quantity of luminance levels, decode the test data, and compare the test data with a corresponding field of the decoded data, and determine that the decoding is correct if the data is equal; and a recognition module, configured to calculate a recognition ratio according to a quantity of times of correct decoding; and if the recognition ratio reaches or exceeds a specified threshold, determine that the light signal with luminance tuned at the specific quantity of luminance levels can be recognized.

According to the present disclosure, code can be encoded and sent by controlling intensity of light emitted by a flash of a mobile terminal such as a mobile phone, so that the amount of sent data can be reduced by using an intensity combination. In addition, a light intensity combination solution can improve security. An increase of light intensity levels significantly increases a quantity of data suitable for encoding, so that null bits may be used to further improve encoding security.

The preferred solution in the present disclosure is especially suitable when signal sending efficiency of a flash of an existing mobile terminal is not high. In the solution, light information can be encoded by tuning a luminance combination of the flash, so that more information can be sent. The mobile terminal controls luminance of the flash before encoding, sends data of a specific information amount, and aims at the photonic receive end and recognizes a light signal, and according to a recognition result, determines a maximum quantity of luminance levels of signals supported by the photonic receive end, and then performs encoding according to a recognition capability of the photonic receive end. In this way, it is ensured that the photonic receive end can recognize the signals, and that code can be encoded and sent by making full use of intensity of light emitted by the flash of the mobile phone.

In an exemplary embodiment of the present disclosure, a recognition ratio is calculated by testing a quantity of times of receiving, by the photonic receive end, correctly decoded information, and a receiving effect is determined according to the recognition ratio, thereby further improving reliability of sending code.

DESCRIPTION OF EMBODIMENTS

The following clearly and completely describes the technical solutions in the implementation manners of the present disclosure with reference to the accompanying drawings in the implementation manners of the present disclosure. Apparently, the described implementation manners are only a part rather than all of the implementation manners of the present disclosure. All other implementation manners obtained by a person of ordinary skill in the art based on the implementation manners of the present disclosure without creative efforts shall still fall within the protection scope of the present disclosure.

Embodiment 1

To address a problem that a limited information amount is transmitted by a flash of a mobile phone, a method in this embodiment encodes information by using intensity of emitted light (the tuning of flash luminance is covered in the prior art, for example, a PhotoTorch plug-in currently can tune flash luminance of an iPhone mobile phone), so as to increase a quantity of signals transmitted per unit time. For example, in a photonic access control system, when a mobile phone is used as a photonic communications terminal (that is, a mobile phone photonic client), the flash of the mobile phone can be controlled to send light information without changing mobile phone hardware. The light information may be encoded and sent by controlling intensity of light emitted by the flash. In this way, the amount of data sent can be reduced by using an intensity combination, and an overall light emitting time is reduced. That is, more information can be transmitted within the same time.

Figure 1:
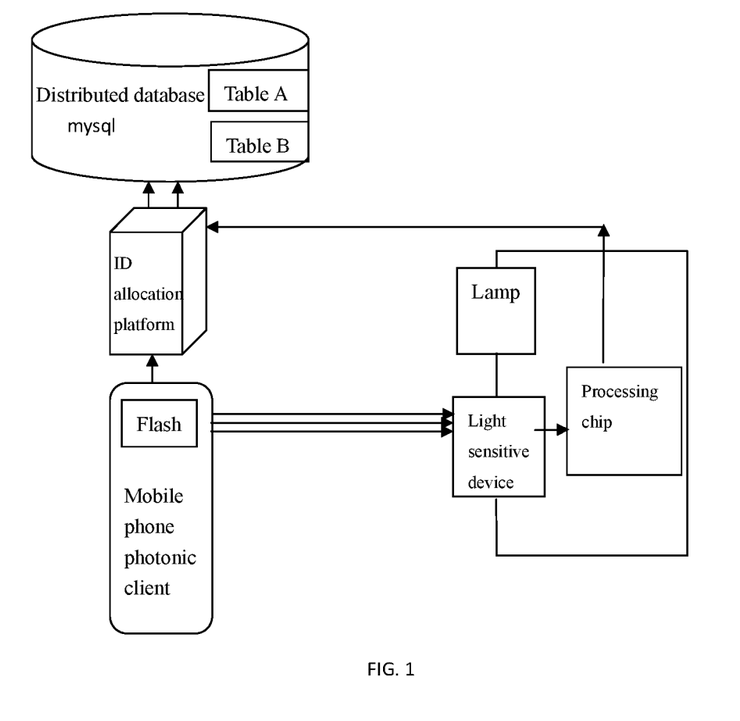
FIG. 1 is a schematic diagram of a system according to Embodiment 1 of the present disclosure.

As shown in FIG. 1, this embodiment provides an ID allocation system of a mobile phone photonic client. The ID allocation system includes the following modules:

Module 1: a server (not shown in the figure), in which is an ID distribution database, for example, a distributed database (mysql) or an SQL Server 2005 or an ORACLE, and communication with the receiving module is enabled.

Module 2: an ID allocation platform, installed on a different PC and connected to an ID distribution database. A unique ID and a verification code, and a unique mapping relationship between the ID and the verification code are generated in a distributed manner by using the ID allocation platform and the server. The ID distribution database needs to simultaneously allocate IDs on ID allocation platforms (networks) distributed and installed on different PCs. Therefore, the database needs to support distributed access.

The ID distribution database is used to centrally control ID distribution. In this way, the ID distribution databases can be managed centrally to prevent an independent database on each ID allocation platform (network) and prevent from allocating an ID repeatedly. For example, Zhang San installs an ID allocation platform (network) and an ID management database on a machine A, and Li Si installs an ID allocation platform (network) and an ID management database on a machine B. If Zhang San randomly allocates an ID 24456 on the machine A and Li Si accidentally allocates the same ID 24456 on the machine B, the system is unable to distinguish whether 24456 belongs to Zhang San or Li Si during unlocking. This embodiment avoids such a circumstance.

An embodiment of the present disclosure further provides a photon data transmission device for a mobile terminal (such as a mobile phone photonic client), including:

an encoding module, configured to: use light signals with different luminance to denote to-be-transmitted data, where a quantity of luminance levels of the light signal is N;

encode 0–(N–1) M-ary numbers when the light signal is a single light signal element: use one light signal element with a corresponding luminance level to represent one M-ary number, so that a series of light signal elements represent a series of M-ary numbers; and perform combination and coding on 0–(N"31 1) M-ary numbers when the light signal is a combination of n light signal elements: use one light signal element combination with a corresponding luminance level combination to represent one M-ary number, so that a series of light signal element combinations represent a series of M-ary numbers, where M and N are natural numbers and n is an integer greater than 1; and a sending device, configured to send the to-be-transmitted data as a light signal.

The light signal element is defined as a minimum unit of a light signal suitable for encoding. A light signal element may have multiple luminance levels, and each luminance level may correspond to a piece of data.

Figure 4:
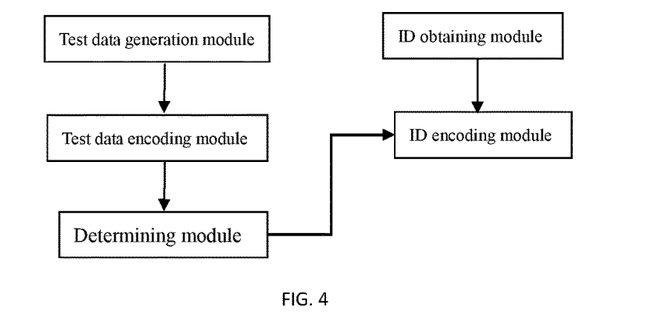
FIG. 4 is a schematic diagram of modules of a mobile phone photonic client according to Embodiment 1 of the present disclosure.

Module 3: a mobile phone photonic client, which, as shown in FIG. 4, further includes:

an ID obtaining module, configured to: according to a received "get ID" instruction that is input by a user, obtain one or more IDs generated by a server;

a test data generation module, configured to generate a set of test data or receive a set of test data from a server;

a test data encoding module, configured to: control luminance of a flash, encode the test data by using light with luminance tuned at a specific quantity of luminance levels, and then aim at a photonic receive end and send the test data as light information;

a determining module, configured to determine a maximum quantity of luminance levels that can be recognized by the photonic receive end, that is, obtain, according to a result of recognizing the test data by the photonic receive end, a maximum quantity of light intensity levels that can be recognized by the photonic receive end for tuning luminance of the light signal; and an ID encoding module, configured to encode a received ID by using a current quantity of luminance levels that is determined as the maximum quantity of light intensity levels.

After obtaining the ID, the mobile phone photonic client encodes light information for the ID to be sent. Before encoding, the mobile phone photonic client controls luminance of a flash and sends data of a specific information amount, then aims at the photonic receive end which recognizes a light signal. According to a recognition result, a maximum quantity of luminance levels of signals supported by the photonic receive end is determined. For example, if light signals of codes 0-7 are sent and the luminance levels for tuning luminance of the light signal are levels 1-8, luminance of the light signal can be encoded: a binary number 000 corresponds to a light signal of luminance level 1, a binary number 001 corresponds to a light signal of luminance level 2, and so on, and 111 corresponds to a light signal of luminance level 8. After such a test is performed, whether a received light signal is decoded correctly can be determined by a program in the photonic receive end. A correctly decoded part is recognizable luminance. If all light signals are decoded correctly, it is determined that the photonic receive end can recognize light signals with luminance tuned at 8 levels. Then a quantity of luminance level for tuning luminance may be increased and then the recognition process is repeated. If a part of the light signal is not correctly decoded, it is determined that the photonic receive end cannot support the light signal with luminance tuned at 8 levels. In this case, a quantity of luminance level for tuning luminance needs to be reduced, and the recognition process is repeated.

After encoding the sent light information, the mobile phone photonic client aims at the photonic receive end and sends light information for a specific quantity of times. The photonic receive end recognizes the light information sent each time. A receiving effect is determined by testing a quantity of times of receiving, by the photonic receive end, the correctly decoded information. For example, if the mobile phone photonic client sends the light information for 100 times and the photonic receive end can correctly parse the light information for 98 times, it indicates that the recognition ratio of the photonic receive end is 98%. The test is repeated for 1000 times, and an average value of recognition ratios is the recognition effect of the photonic receive end. If an average recognition ratio is at least 95%, it may be deemed that the encoding is practicable.

Module 4: a photonic receive end, which includes a light sensitive device and a processing chip, and further includes a lamp used to display a working status, and an interface connected to the network.

The method for allocating an ID for a mobile phone photonic client in this embodiment of the present disclosure is: before the mobile phone photonic client encodes to-be-sent light information, the mobile phone photonic client controls luminance of a flash to send data of a specific information amount, then aims at the photonic receive end which recognizes the light signal. According to a recognition result, a maximum quantity of luminance levels of signals supported by a photonic receive end is determined. After encoding the sent light information, the mobile phone photonic client aims at the photonic receive end and sends light information for a specific quantity of times. The photonic receive end recognizes the light information sent each time, and a receiving effect is determined by testing a quantity of times of receiving, by the photonic receive end, the correctly decoded information.

Figure 2:
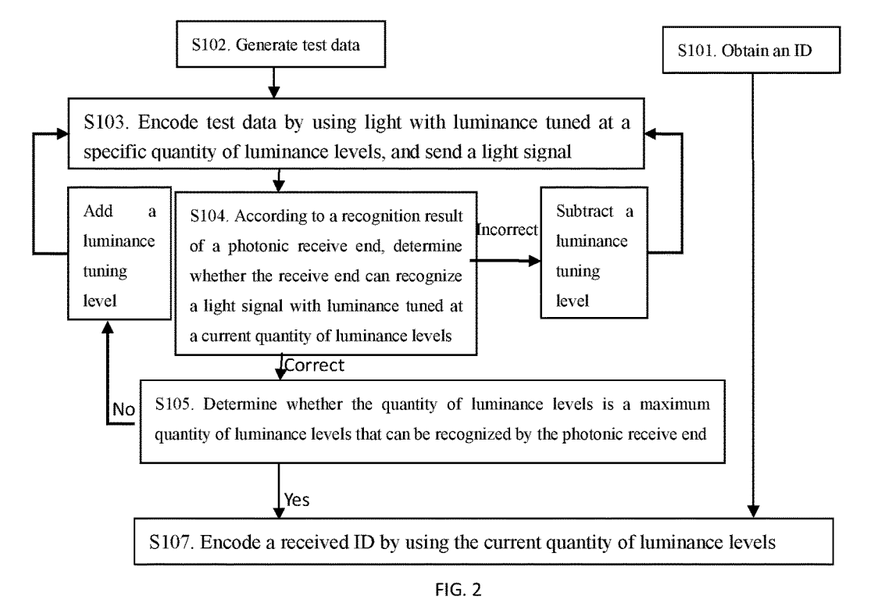
FIG. 2 is a flowchart of a solution in which a mobile phone photonic client transmits information based on energy level control of a flash according to Embodiment 1 of the present disclosure.

FIG. 2 is a flowchart of a solution in which a mobile phone photonic client transmits information based on energy level control of a flash. The method includes the following steps:

S101. Obtain an ID: An administrator sends a request to a web server by using a web browser or other client. The web server randomly generates one or more verification codes and randomly generates one or more IDs at the back end, and binds the generated verification codes with the IDs. The mobile phone photonic client inputs the verification code provided by the administrator, and a "get ID" button on the mobile phone photonic client is tapped. If the verification code is input correctly, the ID corresponding to the verification code is obtained. If the input verification code is not correct, the ID cannot be obtained.

S102. Generate test data: generate a set of test data, where the set of test data needs to be encoded by using a light signal and sent to a photonic receive end. The set of test data corresponding to the light signal readily to be sent is saved into Table A in a mysql database on a host (or a server) over the web.

S103. Encode the test data by using light with luminance tuned at a specific quantity of luminance levels, and send a light signal: after the mobile phone photonic client obtains the ID and before performs light information encoding on the ID, the mobile phone photonic client controls luminance of a flash, encodes the test data by using 8 luminance levels of the light signal, and then aims at a photonic receive end and sends the test data as light information: use a light signal of luminance level 1 to represent a binary number 000, use a light signal of luminance level 2 to represent a binary number 001, and so on, and use a light signal of luminance level 8 to represent a binary number 111.

S104. According to a recognition result of the photonic receive end, determine whether the receive end can recognize a light signal with luminance tuned at a current luminance level: receive and recognize the light signal, and determine whether the received light signal is decoded correctly.

Step S104 and subsequent steps need to be implemented in collaboration with the photonic receive end. A main purpose is to obtain, according to a result of recognizing the test data by the photonic receive end, a maximum quantity of light intensity levels that can be recognized by the photonic receive end for tuning luminance of a light signal. The implementation method is as follows:

After receiving a light signal, the photonic receive end recognizes the light signal, and determines, according to a recognition result, a maximum quantity of luminance levels of signals supported by the photonic receive end: in a program of the photonic receive end, the photonic receive end determines whether a received light signal is correctly decoded; a correctly decoded part corresponds to recognizable luminance; if all the light signals are correctly decoded, it is determined that the photonic receive end can recognize the light signal with luminance tuned at 8 levels, and then step S105 is performed to determine whether a quantity of luminance levels is a maximum quantity of luminance levels that can be recognized by the photonic receive end; and if the quantity of luminance levels is not determined as the maximum quantity of luminance levels, a quantity of luminance level for tuning luminance may be increased and then S103-S104 are repeated. If a part of the light signal is not correctly decoded, it is determined that the photonic receive end cannot support the light signal with luminance tuned at this level. In this case, a quantity of luminance level for tuning luminance needs to be subtracted, and S103-S104 are repeated.

Figure 3:
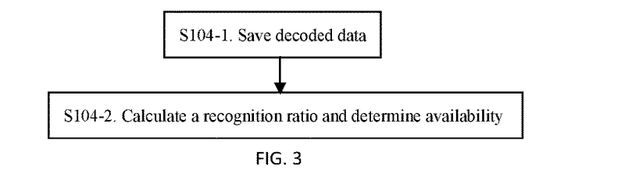
FIG. 3 is a schematic flowchart of determining whether a received light signal is correctly decoded according to Embodiment 1 of the present disclosure.

In this embodiment, the following steps are performed to determine whether the photonic receive end can support the light signal with luminance tuned at this level, as shown in FIG. 3:

S104-1. Save decoding data: The photonic receive end saves decodable data into Table B in a database of a host.

S104-2. Calculate a recognition ratio and determine availability: access Table A and Table B in the database of the host, compare data of a corresponding field in Table A and Table B; and if the data is equal, the recognition is correct. Jump to S101, and perform the test cyclically for 100 times. If the recognition ratio is at least 96%, verification succeeds and step S107 is performed to encode the received ID by using the current quantity of luminance levels. If the recognition ratio is less than 96%, a quantity of luminance level of light intensity is subtracted, S101 to S104-2 are repeated, and the next round of test is performed for 100 times. In this way, the maximum quantity of luminance levels of light intensity that is set for the mobile phone photonic client can be used normally.

In this embodiment of the present disclosure, the mobile phone photonic client encodes to-be-sent light information directly by using three-bit binary numbers. Before encoding, the mobile phone photonic client controls luminance of a flash and sends data of a specific information amount, and then aims at the photonic receive end and recognizes the light signal, and according to a recognition result, determines a maximum quantity of luminance levels of signals supported by the photonic receive end. Then the supported maximum quantity of luminance levels of light intensity is used for encoding when the light information data is actually sent. The recognition ratio threshold is not necessarily set to 96%, and may be changed to other values such as 90% or 99% according to customer requirements and actual conditions of the device. The maximum quantity of luminance levels of signals supported by the photonic receive end does not need to be determined before every occasion of sending data.

In practice, according to requirements, Table A and Table B in this embodiment may also be set in a mobile phone. If Table A and Table B are stored in a mobile phone, data in Table B is transmitted from the photonic receive end to the mobile phone photonic client over the web. For example, the data recognized and decoded by the photonic receive end is transmitted to a server over the web first, and then the data is transmitted to the mobile phone photonic client by means of the server, or the data is directly transmitted from the photonic receive end to the mobile phone photonic client in a point-to-point manner over a wireless network.

Embodiment 2

A difference between this embodiment and Embodiment 1 is that in step S103 in Embodiment 1, when the test data is encoded by using light with luminance tuned at a specific quantity of luminance levels, a quantity of luminance levels for tuning luminance of the light signal is 8; but this embodiment describes a scenario in which the quantity of luminance levels is 4.

In step S103 in this embodiment, light signals numbered 0-3 are sent, and luminance of the light signals is tuned at 1-4 levels. Therefore, the light signals may be grouped for encoding luminance in 16 combinations, and each group includes two light signals. A combination of light signals whose luminance is comprised of luminance 1 and luminance 1 corresponds to binary 0000, a combination of light signals whose luminance is comprised of luminance 1 and luminance 2 corresponds to 0001, a combination of light signals whose luminance is comprised of luminance 1 and luminance 3 corresponds to 0010, a combination of light signals whose luminance is comprised of luminance 1 and luminance 4 corresponds to 0011, a combination of light signals whose luminance is comprised of luminance 2 and luminance 1 corresponds to 0100, a combination of light signals whose luminance is comprised of luminance 2 and luminance 2 corresponds to 0101, and so on, and a combination of light signals whose luminance is comprised of luminance 4 and luminance 4 respectively corresponds to 1111.

In this embodiment of the present disclosure, the mobile phone photonic client encodes to-be-sent light information by using four-bit binary numbers and by using a combination of four light intensity levels. Before encoding, the mobile phone photonic client controls luminance of a flash and sends data of a specific information amount, then aims at the photonic receive end and recognizes the light signal, and according to a recognition result, determines a maximum quantity of luminance levels of signals supported by the photonic receive end. Then the supported maximum quantity of luminance levels of light intensity is used for encoding when the light information data is actually sent.

Embodiment 3

A difference between this embodiment and Embodiment 1 is that in step S103 in Embodiment 1, when the test data is encoded by using light with luminance tuned at a specific quantity of luminance levels, a quantity of luminance levels for tuning luminance of the light signal is 8; but this embodiment describes a scenario in which the quantity of luminance levels is 5.

In step S103, light signals numbered 0-4 are sent, and luminance of the light signals is tuned at 1-5 levels. Therefore, the light signals may be grouped for encoding luminance, and each group includes two light signals. The binary 00000 corresponds to a group of light signals whose luminance is comprised of luminance 1 and luminance 1, 00001 corresponds to a group of light signals whose luminance is comprised of luminance 1 and luminance 2, 00010 corresponds to a group light signals whose luminance is comprised of luminance 1 and luminance 3, 00011 corresponds to comprised of light signals whose luminance is comprised of luminance 1 and luminance 4, 00100 corresponds to a group of light signals whose luminance is comprised of luminance 1 and luminance 5, 00101 corresponds to a group of light signals whose luminance is comprised of luminance 2 and luminance 1, and so on, and 11000 corresponds to a group of light signals whose luminance is comprised of luminance 5 and luminance 5.

In summary, in some embodiments, the present disclosure may encode 0–(N−1) M-ary numbers by using a single light signal element of light signals with N luminance levels, or use one light signal element with a corresponding luminance level to represent one encoded M-ary number, so that a series of light signal elements represent a series of encoded M-ary numbers, where M and N are natural numbers. For example, in Embodiment 1, there are 8 luminance levels, and therefore, a single light signal element can represent one of 8 values, and can completely encode 8 3-bit binary numbers. If there are 4 luminance levels, a single light signal element can represent one of 4 values, and can completely encode 4 2-bit binary numbers. In this encoding manner, a single light signal element represents one binary number, and multiple light signal elements represent a sequence of binary numbers. In another embodiment, there are 10 luminance levels, and therefore, a single light signal element can represent one of 10 values, and can completely encode 10 decimal numbers.

In other embodiments, the present disclosure may also perform combination coding on $0-(N^n-1)$ M-ary numbers by using a combination of n light signal elements. One light signal element combination with a corresponding luminance level combination is used to represent one encoded M-ary number, so that a series of light signal element combinations represent a series of encoded M-ary numbers, where M and N are natural numbers and n is an integer greater than 1. In Embodiment 2, a combination of two light signal elements each with 4 light intensity levels can encode 4*4=16 numbers, for example, encode binary numbers 0000-1111. In Embodiment 3, a combination of two light signal elements each with 5 light intensity levels can encode 5*5=25 numbers, for example, encode binary numbers 00000-11000. For another example, a combination of two light signal elements each with 8 light intensity levels can encode 8*8=64 numbers, for example, encode binary numbers 000000-111111.

In this embodiment of the present disclosure, the mobile phone photonic client encodes to-be-sent light information in a non-combination coding manner or a combination coding manner. Before encoding, the mobile phone photonic client controls luminance of a flash and sends data of a specific information amount, and then aims at the photonic receive end and recognizes the light signal, and according to a recognition result, determines a maximum quantity of luminance levels of signals supported by the photonic receive end. Then the supported maximum quantity of luminance levels of light intensity is used for encoding when the light information data is actually sent.

What is claimed is:

1. A photon data transmission method for a mobile terminal, comprising the following steps:
   using light signals with different luminance to denote to-be-transmitted data, the light signal having N luminance levels;
   encoding $0-(N-1)$ M-ary numbers when the light signal is a single light signal element: using one light signal element with a corresponding luminance level to represent one M-ary number, so that a series of light signal elements represent a series of M-ary numbers;
   performing combination coding on $0-(N^n-1)$ M-ary numbers when the light signal is a combination of n light signal elements: using one light signal element combination with a corresponding luminance level combination to represent one M-ary number, so that a series of light signal element combinations represent a series of M-ary numbers, wherein
   M and N are natural numbers and n is an integer greater than 1; and sending the to-be-transmitted data as a light signal,
   wherein, before the encoding step, the method further comprises the following steps:

A. generating test data: generating a set of test data or receiving a set of test data from a server;
   B. encoding the test data by using light with luminance tuned at a specific quantity of luminance levels, and sending a test light signal: controlling luminance of a flash, encoding the test data by using the light with luminance tuned at the specific quantity of luminance levels, and then aiming at a photonic receive end and sending the test data as light information; and encoding the $0-(N-1)$ M-ary numbers when the test light signal is a single light signal element: using one light signal element with a corresponding luminance level to represent one M-ary number, so that a series of light signal elements represent a series of M-ary numbers; or
   performing combination coding on $0-(N^n-1)$ M-ary numbers when the test light signal is a combination of n light signal elements: using one light signal element combination with a corresponding luminance level combination to represent one M-ary number, so that a series of light signal element combinations represent a series of M-ary numbers, wherein M and N are natural numbers and n is an integer greater than 1; and
   C. obtaining, according to a result of recognizing the test data by the photonic receive end, a maximum quantity of light intensity levels that can be recognized by the photonic receive end for tuning luminance of a light signal; and
   encoding the to-be-transmitted data in the encoding step by using the light signal with luminance tuned at the obtained maximum quantity of light intensity levels.

2. The photon data transmission method for a mobile terminal according to claim 1, wherein step C comprises the following steps:
   C1. determining, according to a recognition result of the photonic receive end, whether the photonic receive end can recognize a light signal with luminance tuned at a current specific quantity of luminance levels; and
   C2. searching for a maximum quantity of light intensity levels that can be recognized by the photonic receive end for tuning luminance of the light signal: after determining that the photonic receive end can recognize the light signal with luminance tuned at the specific quantity of luminance levels, recording a value of the quantity of recognizable luminance levels, increasing a quantity of the luminance level for tuning luminance, and repeating step B; or, after determining that the photonic receive end cannot recognize the light signal with luminance tuned at the specific quantity of luminance levels, reducing a quantity of the luminance level for tuning luminance, and then repeating step B; and
   C3. recording a maximum value in all recorded quantities of recognizable luminance levels as a maximum quantity of light intensity levels that can be recognized by the photonic receive end for tuning luminance of the light signal.

3. The photon data transmission method for a mobile terminal according to claim 2, wherein step C1 comprises the following steps:
   C1-1. repeating, for a preset quantity of times, the step of encoding the test data by using the light with luminance tuned at the specific quantity of luminance levels, and aiming at the photonic receive end and sending the test data as light information, and after the receive end receives and recognizes the test data, comparing and determining whether decoding each time is correct: comparing the test data with a corresponding field of decoded data, wherein it is indicated that the decoding is correct if the data is equal; and C1-2. calculating a recognition ratio and determining availability: calculating a recognition ratio according to a quantity of times of correct decoding; and if the recognition ratio reaches or exceeds a specified threshold, determining that the photonic receive end can recognize the light signal with luminance tuned at the specific quantity of luminance levels.

4. The photon data transmission method for a mobile terminal according to claim 3, wherein the method further comprises the following steps:

storing the test data: saving the test data into a first storage table of a host or a server over the web; and storing the received and decoded data: saving, by the photonic receive end, the decoded data into a second storage table of the same host or server, wherein the comparing and determining, in step C1-1, whether decoding each time is correct is implemented in the following way: accessing the first storage table and the second storage table of the host or server, and comparing data of a corresponding field in the first storage table and the second storage table.

5. A photon data transmission device for a mobile terminal, comprising:

an encoding module, configured to: use light signals with different luminance to denote to-be-transmitted data, wherein a quantity of luminance levels of the light signal being N;

encode 0–(N–1) M-ary numbers when the light signal is a single light signal element: use one light signal element with a corresponding luminance level to represent one M-ary number, so that a series of light signal elements represent a series of M-ary numbers, wherein M and N are natural numbers;

perform combination coding on 0–($N^n$–1) M-ary numbers when the light signal is a combination of n light signal elements: use one light signal element combination with a corresponding luminance level combination to represent one M-ary number, so that a series of light signal element combinations represent a series of M-ary numbers, wherein M and N are natural numbers and n is an integer greater than 1; and a sending device, configured to send the to-be-transmitted data as a light signal, wherein, the device further comprises:

a test data generation module: configured to generate a set of test data or receive a set of test data from a server;

a test data encoding module, configured to: control luminance of a flash, encode the test data by using light with luminance tuned at a specific quantity of luminance levels, and then aim at a photonic receive end and send a test light signal as light information;

encode 0–(N–1) M-ary numbers when the test light signal is a single light signal element: use one light signal element with a corresponding luminance level to represent one M-ary number, so that a series of light signal elements represent a series of M-ary numbers;

perform combination coding on 0–($N^n$–1) M-ary numbers when the test light signal is a combination of n light signal elements: use one light signal element combination with a corresponding luminance level combination to represent one M-ary number, so that a series of light signal element combinations represent a series of M-ary numbers, wherein M and N are natural numbers and n is an integer greater than 1; and a determining module, configured to determine a maximum quantity of luminance levels that can be recognized by the photonic receive end, wherein the encoding module encodes the to-be-transmitted data according to a light signal with luminance tuned at the maximum quantity of light intensity levels.

6. The photon data transmission device for a mobile terminal according to claim 5, wherein the determining module comprises a discrimination device that determines, according to a recognition result of the photonic receive end, whether the photonic receive end can recognize a light signal with luminance tuned at a current specific quantity of luminance levels, and the discrimination device comprises:

a comparing and determining module, configured to: for the light information sent by aiming at the photonic receive end after repeating, for a preset quantity of times, the step of encoding the test data by using light with luminance tuned at the specific quantity of luminance levels, compare the test data with a corresponding field of data decoded by the photonic receive end, and determine that the decoding is correct if the data is equal; and a recognition module, configured to calculate a recognition ratio according to a quantity of times of correct decoding of the photonic receive end; and if the recognition ratio reaches or exceeds a specified threshold, determine that the photonic receive end can recognize the light signal with luminance tuned at the specific quantity of luminance levels.

* * * * *